(12) United States Patent
Haag

(10) Patent No.: US 12,248,106 B2
(45) Date of Patent: Mar. 11, 2025

(54) METHOD FOR DETERMINING A FUNCTIONAL STATUS OF AN ULTRASONIC SENSOR BY MEANS OF A TRANSFER FUNCTION OF THE ULTRASONIC SENSOR, ULTRASONIC SENSOR DEVICE AND MOTOR VEHICLE

(71) Applicant: Valeo Schalter und Sensoren GmbH, Bietigheim-Bissingen (DE)

(72) Inventor: Fabian Haag, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 348 days.

(21) Appl. No.: 16/491,336

(22) PCT Filed: Mar. 8, 2018

(86) PCT No.: PCT/EP2018/055806
§ 371 (c)(1),
(2) Date: Sep. 5, 2019

(87) PCT Pub. No.: WO2018/162659
PCT Pub. Date: Sep. 13, 2018

(65) Prior Publication Data
US 2020/0072955 A1 Mar. 5, 2020

(30) Foreign Application Priority Data
Mar. 9, 2017 (DE) .......................... 102017105043.4

(51) Int. Cl.
*G01S 7/52* (2006.01)
*G01S 15/931* (2020.01)

(52) U.S. Cl.
CPC ........ *G01S 7/52004* (2013.01); *G01S 15/931* (2013.01)

(58) Field of Classification Search
CPC .......................... G01S 7/52004; G01S 15/931
See application file for complete search history.

(56) References Cited

U.S. PATENT DOCUMENTS 4,700,569 A * 10/1987 Michalski ............... G01S 7/003
367/908
5,991,234 A * 11/1999 Sejalon ................. B06B 1/0246
367/13

(Continued)

FOREIGN PATENT DOCUMENTS

DE    102008042820 A1    4/2010
DE    102012200743 A1    7/2013

(Continued)

OTHER PUBLICATIONS

International Search Report and Written Opinion in corresponding International Application No. PCT/EP2018/055806, mailed May 28, 2018 (15 pages).

(Continued)

*Primary Examiner* — Isam A Alsomiri
*Assistant Examiner* — Abdallah Abulaban
(74) *Attorney, Agent, or Firm* — Osha Bergman Watanabe & Burton LLP

(57) ABSTRACT

The invention relates to a method for determining a functional status of an ultrasonic sensor (5a) of an ultrasonic sensor device (5) for a motor vehicle (1), which is designed to emit an ultrasonic signal (8) into an environment (4) of the motor vehicle (1) and/or to receive an echo signal (9) of the ultrasonic signal (8), wherein an electrical test signal (P) is generated, which is applied to the ultrasonic sensor (5a), wherein at least one electrical characteristic parameter (K) of the ultrasonic sensor (5a) affected by the electrical test (Continued)

Figure 1:
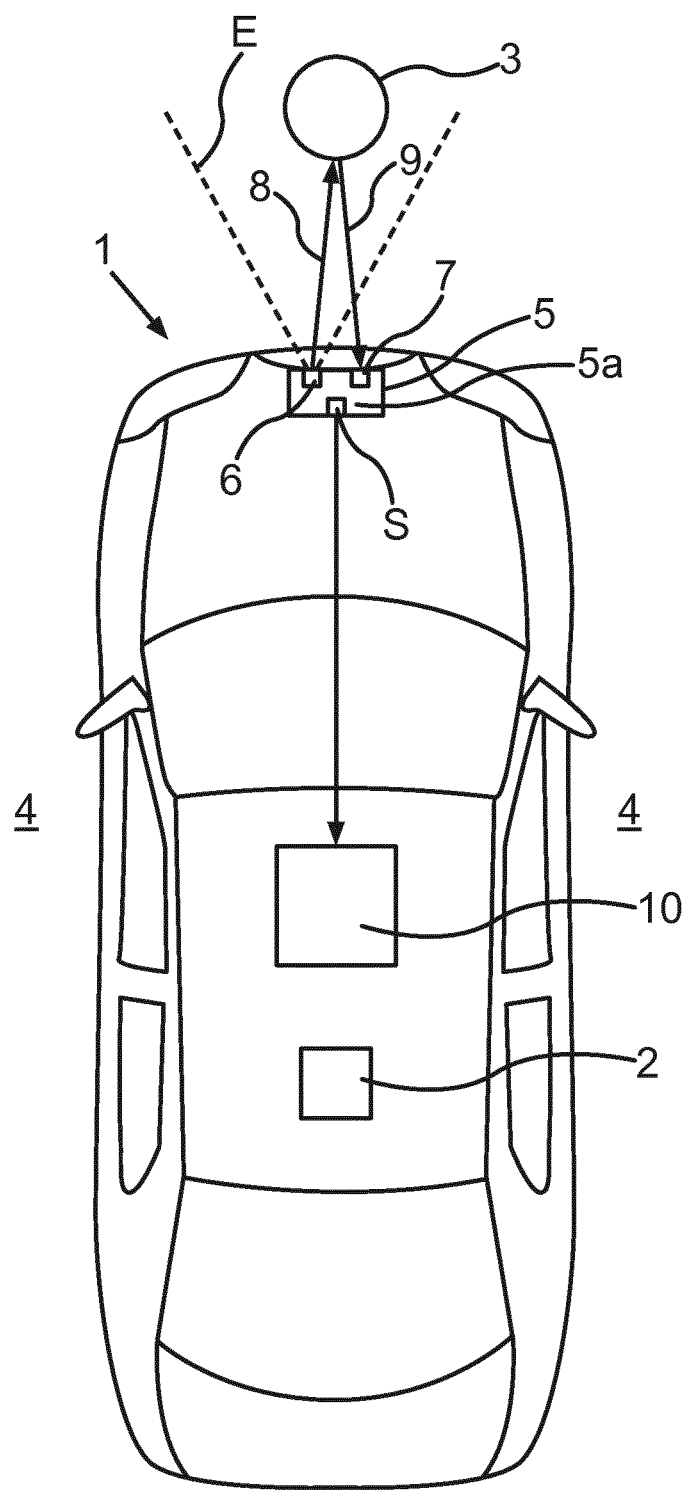

signal (P) is evaluated and as a function thereof a transfer function (13) of the ultrasonic sensor (5a) is determined, which is compared with a reference transfer function (11) and the functional state of the ultrasonic sensor (5a) is determined depending on the comparison.

18 Claims, 3 Drawing Sheets

(56) References Cited

U.S. PATENT DOCUMENTS

| | | | |
|---|---|---|---|
| 9,423,291 B2* | 8/2016 | Jurzitza | B06B 1/0261 |
| 2007/0107516 A1* | 5/2007 | Fujimoto | G01N 29/036 |
| | | | 73/579 |
| 2012/0017684 A1 | 1/2012 | Reiche et al. | |
| 2015/0170662 A1* | 6/2015 | Krishnan | G10L 19/02 |
| | | | 704/205 |

FOREIGN PATENT DOCUMENTS

| | | | | |
|---|---|---|---|---|
| DE | 102012220311 A1 | | 5/2014 | |
| DE | 102014213122 A1 | * | 1/2016 | ............ G01S 15/93 |
| DE | 102014115000 A1 | | 4/2016 | |
| EP | 0004626 B1 | * | 11/1981 | ........... G01S 15/101 |
| JP | 2009025153 A | | 2/2009 | |

OTHER PUBLICATIONS

German Search Report in corresponding German Application No. 10 2017 105 043.4, dated Oct. 10, 2017 (7 pages).

First Office Action in corresponding Chinese Application No. 201880017250.2, dated Aug. 17, 2022 (22 pages).

He Xicai et al. "Sensore Technology and Application 1st Edition", Apr. 30, 2005, pp. 193-194 (4 pages), Apr. 30, 2005.

* cited by examiner

METHOD FOR DETERMINING A FUNCTIONAL STATUS OF AN ULTRASONIC SENSOR BY MEANS OF A TRANSFER FUNCTION OF THE ULTRASONIC SENSOR, ULTRASONIC SENSOR DEVICE AND MOTOR VEHICLE

The invention relates to a method for determining a functional status of an ultrasonic sensor of an ultrasonic sensor device for a motor vehicle, which is designed to emit an ultrasonic signal into an environment of the motor vehicle and/or to receive an echo signal of the ultrasonic signal. The invention additionally relates to an ultrasonic sensor device and to a motor vehicle.

Ultrasonic sensors on motor vehicles are designed in particular for measuring the distances of objects. In ultrasonic sensors, in particular an electro-acoustic energy conversion takes place. Irrespective of the physical principle of this energy conversion, which, among other things, can be mechanical-inductive, mechanical-capacitive, mechanical-restrictive, magnetic-restrictive or electrostrictive in nature, for any energy-converting element there is a possibility of being exposed to internally or externally induced changes, which depending on their magnitude can give rise to a falsification of the measurement result or a complete sensor failure. In the prior art such a sensor failure is usually detected by means of plausibility checks of the sensor-operated system. On the other hand, sensor changes are not detected.

DE 10 2014 115 000 A1 discloses a method for operating an ultrasonic sensor device of a motor vehicle, in which in a measuring mode for detecting an object in an area surrounding the motor vehicle, a transducer of an ultrasonic sensor is stimulated with a transmission signal by means of a transmitter stage to emit an ultrasonic signal. By means of a receiver stage, on the basis of a signal generated by the transducer a measuring signal is provided. During the measurement operation, by means of a diagnostic device a functional capacity of the ultrasonic sensor device is tested on the basis of the transmitted signal and/or the measurement signal. In the prior art, the emitted ultrasonic signal and the received echo signal are used as a basis for deducing the functionality of the ultrasonic sensor. A disadvantage of this is in particular that the ultrasonic signal and the echo signal are dependent on environmental effects, so that an accurate diagnosis of the ultrasonic sensor on the basis of the emitted ultrasonic signal and the received echo signal is liable to error.

The object of the present invention is to specify a method, an ultrasonic sensor device as well as a motor vehicle, by means of which at least one functional status of the ultrasonic sensor can be better determined.

This object is achieved by means of a method, an ultrasonic sensor device and a motor vehicle in accordance with the independent claims.

One aspect of the invention relates to a method for determining a functional status of an ultrasonic sensor of an ultrasonic sensor device for a motor vehicle, which is designed to emit an ultrasonic signal into an environment of the motor vehicle and/or to receive an echo signal of the ultrasonic signal.

To this end an electrical test signal is generated and applied to the ultrasonic sensor, wherein at least one electrical characteristic parameter of the ultrasonic sensor affected by the electrical test signal is evaluated. Depending on this evaluation, a transfer function of the ultrasonic sensor is determined, which is compared with a reference transfer function. Depending on the comparison, the functional status of the ultrasonic sensor is determined. The reference transfer function characterizes a reference functional status.

In particular, the functional status of the ultrasonic sensor can thereby be determined directly and is therefore not distorted by, for example, environmental effects. This makes it possible, in particular, to carry out a more precise determination of the functional status of the ultrasonic sensor, so that the ultrasonic sensor can not only be checked for failure or functional capability, but also other functional states can be determined, such as a degree of contamination or a degree of icing of the ultrasonic sensor.

The determination of the functional status is thus carried out internally to the sensor, which also means that this functional test no longer requires emitting an ultrasonic signal by the ultrasonic sensor under test, nor any echo signal to be received for evaluation.

The ultrasonic sensor transfer function describes in particular the mathematical relationship between the input and the output signal of the ultrasonic sensor. In particular, this means that the electro-mechanical properties of the ultrasonic sensor are described. By means of the transfer function, for an arbitrary input signal the corresponding output signal, in other words the response of the ultrasonic sensor to the output signal, can be determined. Since the ultrasonic sensors can in particular be operated in resonance mode, the transfer function of the ultrasonic sensor at the resonance frequency is of particular importance.

In particular, a functional state determination model can be provided for the ultrasonic sensor device.

In particular, it can be provided that an appropriate action is carried out after determination of a functional status. For example, in the event of a fault in the ultrasonic sensor a warning notification can be generated, so that a person in the motor vehicle is notified that the ultrasonic sensor is impaired, at least in its functionality. It is also possible that if icing of the ultrasonic sensor is detected, for example, a heating element of the ultrasonic sensor is activated to remove the ice. If, for example due to ageing of a ceramic of a piezo-ultrasonic transducer, the required sound pressure can no longer be delivered at a given power, then, for example, the power of the ultrasonic transducer can be increased accordingly by means of a control device, so that a further reliable operation of the ultrasonic sensor can still be realized.

In particular, at least one ultrasonic signal can be emitted and an echo signal can be received in a first operating state of the ultrasonic sensor, and a self-diagnosis of the ultrasonic sensor can be performed by applying the electrical test signal in a second operating state, different from the first operating state, of the ultrasonic sensor. Thus, in the first operating state, normal mode as it were, an ultrasonic signal is emitted and a corresponding echo signal reflected from an object is received, as normal. For this purpose, an excitation signal by way of which the emitted ultrasonic signal is then generated can in particular be applied to the piezo of the ultrasonic converter or the electronic circuit of the piezo (in particular coupling network of the piezo). The second operating state can also be referred to as diagnostic mode. In the second operating state, a self-diagnosis of the ultrasonic sensor is then performed without transmitting an ultrasonic signal into the environment of the motor vehicle (in contrast to the first operating state). In other words, the self-diagnosis does not require sound to be emitted.

The test signal can in particular differ from an excitation signal by way of which an emitted ultrasonic signal is generated. Above all, the test signal of the second operating state can differ from the excitation signal by way of which the emitted ultrasonic signal of the first operating state is generated. The test signal of the diagnostic mode thus differs from the excitation signal of the emitted ultrasonic signal during normal mode essentially in its signal properties.

In one design, an amplitude of the test signal can be smaller than an amplitude of the excitation signal. Above all, the amplitude of the test signal of the second operating state can be smaller than the amplitude of the excitation signal by way of which the emitted ultrasonic signal of the first operating state is generated. By way of example, the amplitude of the test signal can be smaller than the amplitude of the excitation signal by a factor of at least 2 (that is to say at least half), in particular smaller by a factor of at least 5, in particular smaller by a factor of at least 10.

In one alternative or additional embodiment, a bandwidth of the test signal can be greater than a bandwidth of the excitation signal. Above all, the bandwidth of the test signal of the second operating state can be greater than the bandwidth of the excitation signal by way of which the emitted ultrasonic signal of the first operating state is generated. For example, the bandwidth of the test signal can be between 10 and 50 kHz, in particular between 15 and 25 kHz, and/or the bandwidth of the excitation signal can be between 2 and 20 kHz, in particular between 5 and 10 kHz. The bandwidth of the test signal can thus be greater than the bandwidth of the excitation signal for example by a factor of at least 2 (that is to say at least twice as great).

In one alternative or additional embodiment, a frequency band of the test signal contains the resonance frequency of the ultrasonic sensor, and the frequency band of the test signal can in particular lie symmetrically about the resonance frequency. As an alternative or in addition, a frequency band of the excitation signal might not contain the resonance frequency of the ultrasonic sensor or lie next to the resonance frequency, and the frequency band of the excitation signal can in particular lie asymmetrically with respect to the resonance frequency.

In accordance with an advantageous design, the test signal can be generated by a control device in the form of a harmonic signal or as a step signal or as a pulse signal. The harmonic signal is an oscillation, the waveform of which can be described by a sinusoidal function. Thus, the ultrasonic sensor is excited with an electrical test signal, which can correspond to a sine function. In particular, the frequency can vary over time in the relevant range. The step signal represents a further option for verifying the functional status of the ultrasonic sensor. At an input of an electronic circuit of the ultrasonic sensor (in particular of an electronic circuit of the piezo, for example a coupling network of the piezo), a step function is applied which then also results in a change of the voltage at the output of the ultrasonic sensor. The temporal waveform of this voltage is also referred to as the step response. The response to the step function can be used to infer the functional status of the ultrasonic sensor. A further possibility is that a pulse signal is generated by the control device as the test signal. In the case of a pulse signal the ultrasonic sensor is electrically excited and the vibration behaviour of the ultrasonic sensor is electrically monitored, and on the basis of the vibrational response, conclusions can be drawn as to the functional status of the ultrasonic sensor. By stimulating the ultrasonic sensor with a harmonic signal or with a step signal or a pulse signal as a test signal, a self-diagnosis of the ultrasonic sensor can thus be carried out directly and in a simple manner, without the need to transmit an ultrasonic signal into the environment of the motor vehicle.

It has also proved advantageous if the transfer function is determined as a function of an impedance frequency response. In particular, the impedance frequency response is the input-impedance frequency response of the electromechanical ultrasonic sensor. This has the advantage that the transfer function of the ultrasonic sensor can be determined very simply, because in particular either the electrical voltage or the electric current are in a known relationship to the mechanical parameters of the ultrasonic sensor. Thus, with a change of only one parameter within the ultrasonic sensor the impedance frequency response can be determined, which in turn allows the transfer function of the ultrasonic sensor to be determined.

It is also advantageous if the impedance frequency response is determined as a function of an injected current as an electrical test signal, of a measured voltage which is dependent thereon as an electrical characteristic parameter, and of a phase angle of the injected current relative to the measured voltage, which is implemented as an electrical characteristic parameter. Using this configuration the current-voltage transfer function of the ultrasonic sensor can be determined with high accuracy.

It has also proved to be advantageous if the impedance frequency response is determined as a function of an injected voltage as an electrical test signal, of a measured current which is dependent thereon as an electrical characteristic parameter, and of a phase angle of the injected voltage relative to the measured current, which is implemented as an electrical characteristic parameter. Using this configuration the voltage-current transfer function of the ultrasonic sensor can be determined with high accuracy.

According to a further advantageous configuration, the transfer function can be determined at the resonance frequency of the ultrasonic sensor. As ultrasonic sensors are designed in particular as ultrasonic sensors with piezo-based flexural transducers, these have the highest efficiency in particular in the resonance operating mode, so that the ultrasonic sensor is operated in particular in the resonance mode. In particular, from a determination of the transfer function in the resonance mode, i.e. at the resonance frequency of the ultrasonic sensor, the functional status of the ultrasonic sensor can be determined. This does not require a relevant transfer function to be determined for each frequency of the ultrasonic sensor, rather the determination takes place at the resonance frequency of the ultrasonic sensor, which in particular allows computing power in the control device to be saved.

It has also proved advantageous if a multiplicity of transfer functions is determined at a multiplicity of acoustic frequencies, the multiplicity of acoustic frequencies being generated in a frequency band between $+/-\Delta f$ around the resonance frequency $f_{res}$. Since as a result of its design each ultrasonic sensor has a different resonance frequency, the respective transfer function can therefore be determined in particular in a frequency band around the resonant frequency $f_{res}$ of a reference ultrasonic sensor. For example, a reference ultrasonic sensor may have a resonance frequency $f_{res}$ of 45 kHz. Due to manufacturing tolerances, however, the resonance frequency of the ultrasonic sensor can vary by $+/-\Delta f$. For example, a frequency band of $+/-5$ kHz, i.e. from 40 kHz to 50 kHz, can be generated around the resonance frequency $f_{res}$ of 45 kHz, in which the transfer function is determined. The $\Delta f$ can in particular correspond to the manufacturing tolerances of the ultrasonic sensor. The transfer function can therefore be determined particularly reliably and in an ultrasonic sensor-specific manner, thus enabling the functional status of the specific ultrasonic sensor to be deduced. In addition, frequencies outside of the frequency band can also be disregarded, which also saves computing power.

According to a further advantageous design, an electrical model or equivalent circuit of the ultrasonic sensor with a multiplicity of electrical components can be generated, wherein the electrical model electrically describes the mechanical ultrasonic sensor, parameter values of the electrical model being characterized by the transfer function. In particular, by a comparison of the multiplicity of electrical components with a multiplicity of electrical components describing the reference transfer function, the functional status of the ultrasonic sensor can then be determined. This enables a simple and accurate quantification of the functional status of the ultrasonic sensor on the basis of electrical components.

It is also advantageous if the electrical model of the ultrasonic sensor and/or the reference ultrasonic sensor is formed by a first capacitor, a second capacitor separate to the first capacitor, an inductor and an ohmic resistor, where the second capacitor, the inductor and the ohmic resistor are connected in series and the first capacitor is connected in parallel with the series circuit. As a result, the ultrasonic sensor is described by means of a simple equivalent circuit. The electrical components of this equivalent circuit are simple electrical components whose values can be easily determined, allowing conclusions as to the functional status of the ultrasonic sensor to be easily made. The fact that each of the electrical components has a different electrical behaviour means that a plurality of functional states of the ultrasonic sensor, which depend on a plurality of influences, can be modelled, so that a precise determination of the current functional status of the ultrasonic sensor can be implemented.

It has also proved advantageous if a physical capacitance of the ultrasonic sensor is described by means of the first capacitor, a mechanical compliance of a diaphragm of the ultrasonic sensor by means of the second capacitor, a moving mass of the diaphragm by means of the inductor and a damping of the acoustic signal by means of the ohmic resistance. In particular, by means of the physical capacitance, the mechanical compliance, the moving mass and the damping, the at least one functional status of the ultrasonic sensor can be determined. For example, by means of a change in the first capacitor, i.e. the physical capacitance, a defect in the piezoceramic can be determined. For example, in the event of a reduction of the first capacitance of the first capacitor such a defect may be present.

In particular, the second capacitor, the inductor and the ohmic resistor describe the electro-acoustic model of the sound conversion of the ultrasonic sensor. In the event of a change in the capacitance of the second capacitor, in other words the mechanical compliance or the reciprocal of the stiffness, the presence of ice on the ultrasonic sensor can be deduced, for example, since the compliance decreases as soon as ice is present on a diaphragm of the ultrasonic sensor. Particularly in the event of ice on the diaphragm the moving mass of the membrane also changes, which is represented by the inductance, so that in particular in the presence of ice, the inductance also changes. It is also possible that in the event of contamination of the ultrasonic sensor, in other words if there is dirt on the diaphragm of the ultrasonic sensor, there is additional mass on the diaphragm of the ultrasonic sensor, so that the inductance changes here also. The ohmic resistance can be used in particular to detect the damping of the ultrasonic signal in the environment, the attenuation taking place in particular due to airborne sound attenuation, which depends in particular on the outside temperature and humidity.

It is also advantageous if relevant parameter values of the first capacitor, the second capacitor, the inductor and the ohmic resistance of the ultrasonic sensor are determined by means of a parameter value adjustment, in particular by means of a numerical optimisation, in such a way that using these adjusted parameter values the transfer function is obtained in the form of a model. In particular by means of a parameter fitting, which is what the parameter adjustment is, in the form of the numerical optimisation of the parameter fit it is possible to determine the parameter values of the corresponding electrical components very simply, which allows the functional status of the ultrasonic sensor to be determined quickly and easily.

It has also proved advantageous if the reference transfer function and/or parameter values of a reference ultrasonic sensor that produces the reference transfer function are stored on a storage medium of the ultrasonic sensor device for a multiplicity of potential functional states. By means of this configuration, a high level of accuracy in the functional status determination can be achieved. In particular, different environmental influences, ageing effects or sensor effects or the changes in the transfer function as a result of these influences can then be stored together on the storage medium, allowing the functional state of the ultrasonic sensor to be determined accurately for a wide range of potential situations in everyday use. This makes it possible, in particular, to operate the ultrasonic sensor safely and reliably.

It is also advantageous if the method can be implemented in a plurality of modes of operation of the motor vehicle, in particular during the driven operation of the motor vehicle. This means that the functional status determination can be carried out in a plurality of operating modes of the motor vehicle. In particular, the ultrasonic sensor can therefore be operated reliably and safely in driving operation and other operating modes.

In particular, it can be provided that information from at least one other sensor, such as a temperature sensor and/or an air humidity sensor and/or other sensor types, can also be taken into account in determining the functional status. The at least one other sensor can be part of the ultrasonic sensor and/or the ultrasonic sensor device and/or the motor vehicle.

The invention also relates to an ultrasonic sensor device with at least one ultrasonic sensor for a motor vehicle, with a transmission device for transmitting ultrasonic signals, with a receiving device for receiving an echo signal of the ultrasonic signals and with a control device of the ultrasonic sensor, which is designed to carry out a previously described method or an advantageous embodiment thereof.

The invention also relates to a motor vehicle having an ultrasonic sensor device. In particular, the motor vehicle is in the form of a passenger car.

Advantageous embodiments of the method according to the invention are to be regarded as advantageous embodiments of the ultrasonic sensor device according to the invention and of the motor vehicle, wherein the ultrasonic sensor device according to the invention and the motor vehicle according to the invention have material features which enable an implementation of the method or an advantageous embodiment thereof.

Additional features of the invention arise from the claims, the figures and the description of the figures. The features and feature combinations cited in the description above and the features and feature combinations cited in the description of the figures below and/or shown in the figures alone are applicable not only in the respective combination indicated but also in other combinations or in isolation, without departing from the scope of the invention. Therefore, such embodiments of the invention are also to be considered as comprised and disclosed as are not explicitly shown or explained in the figures, but which emerge from and can be generated from the embodiments described by the separate feature combinations. Embodiments and combinations of features which do not have all features of an originally formulated independent claim are therefore also to be regarded as disclosed. Furthermore, designs and combinations of features, in particular those of the designs described above, which go beyond or differ from the feature combinations set out in the cross-references of the claims, shall also be considered to be disclosed.

Exemplary embodiments of the invention will be explained below, with reference to schematic drawings.

Figure 2:
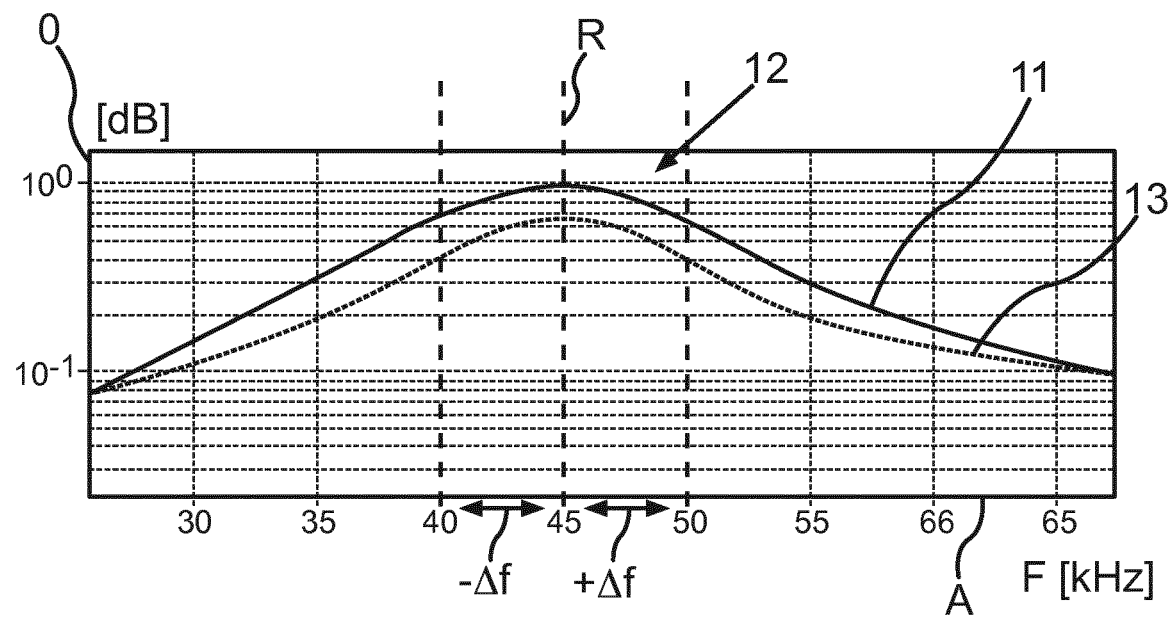
Figure 3:
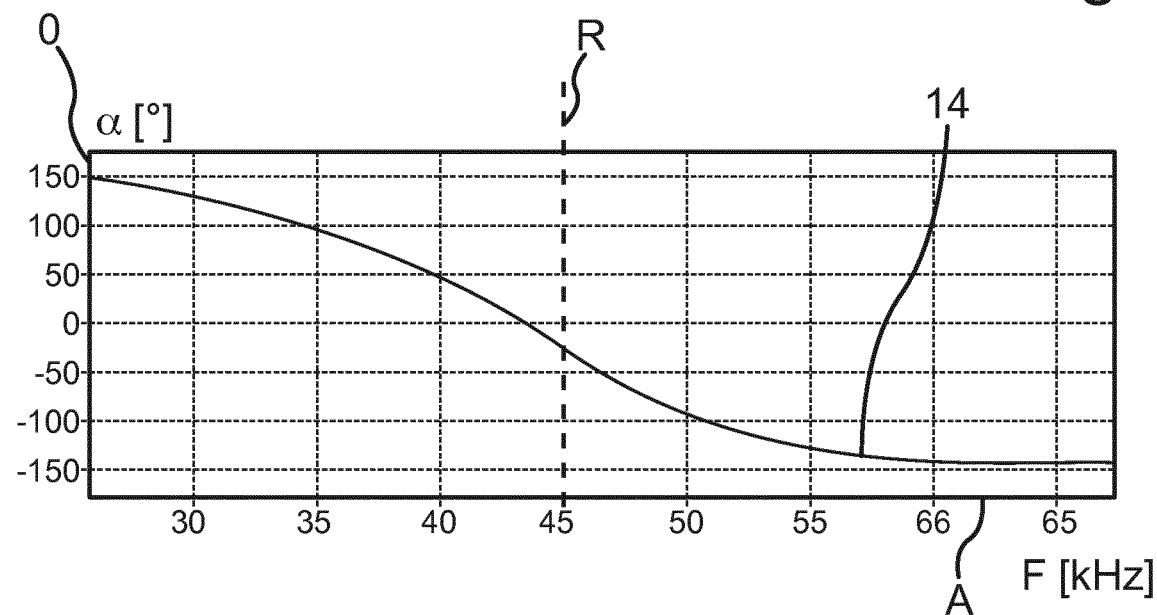
Figure 4:
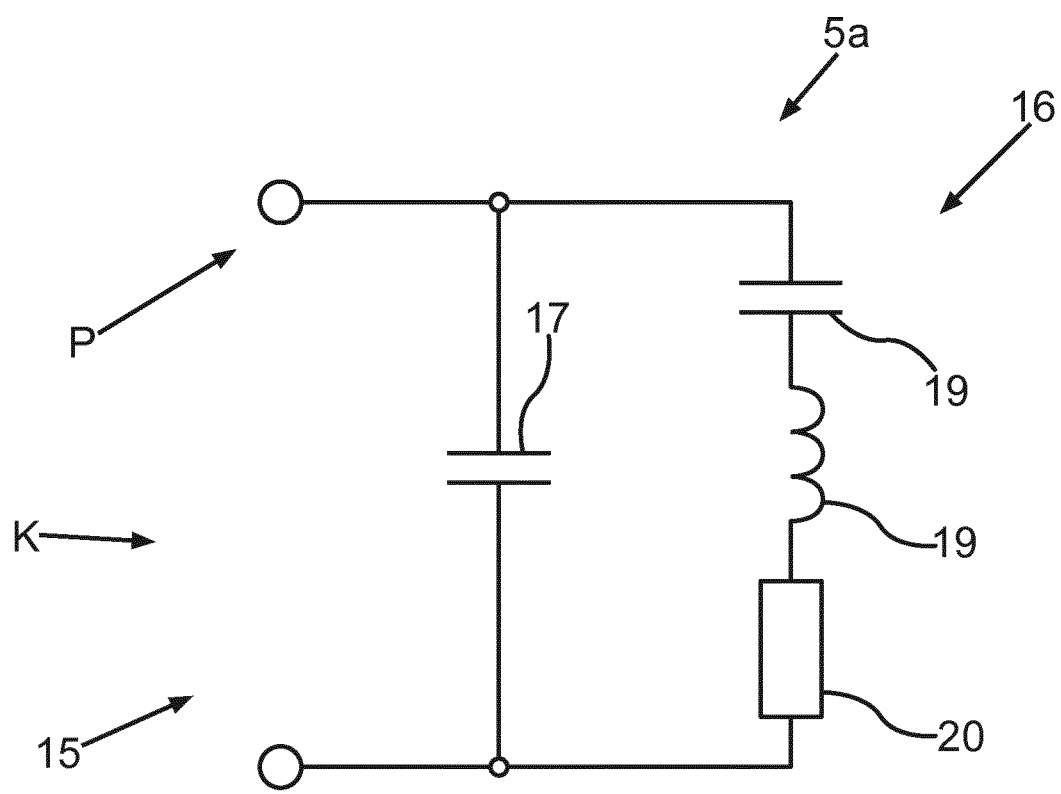

The figures show:

FIG. 1 a schematic plan view of an exemplary embodiment of a motor vehicle according to the invention having an embodiment of an ultrasonic sensor device according to the invention;

FIG. 2 a schematic frequency-signal amplitude curve for determining a transfer function of an embodiment of an ultrasonic sensor;

FIG. 3 a schematic frequency-impedance curve for determining an impedance frequency response of one embodiment of an ultrasonic sensor; and FIG. 4 a schematic equivalent circuit diagram of an embodiment of an ultrasonic sensor.

In the Figures, identical or functionally equivalent elements are indicated by identical reference marks.

FIG. 1 shows a motor vehicle 1 according to one embodiment of the present invention. The motor vehicle 1 in the present exemplary embodiment is designed as a passenger car. The motor vehicle 1 comprises a driver assistance system 2. With the driver assistance system 2, for example, an object 3 located in the surrounding area 4 of the motor vehicle 1 can be detected. In particular, by means of the driver assistance system 2 a distance between the motor vehicle 1 and the object 3 can be determined.

The driver assistance system 2 comprises at least one ultrasonic sensor device 5. The ultrasonic sensor device 5, in turn, has at least one ultrasonic sensor 5a. The ultrasonic sensor 5a comprises a transmitting device 6, by means of which at least one ultrasonic signal 8, in particular a plurality of ultrasonic signals, can be emitted. The ultrasonic sensor device 5 in this case is arranged on a front region of the motor vehicle 1. The ultrasonic sensor device 5 can also be arranged on other areas, such as a rear section or a side region of the motor vehicle 1. The following example is thus not to be regarded as exhaustive, but only for illustrative purposes.

With the transmitting device 6, the ultrasonic signals 8 can be emitted within a predetermined coverage range E or a predetermined angular range, by means of a diaphragm.

In addition, the ultrasonic sensor device 5 comprises a receiving device 7, by means of which reflected ultrasound signals can be received as echo signals 9 which have been reflected by the object 3, in particular via the diaphragm. With the receiving device 7, ultrasonic signals 9 reflected from the object 3 can therefore be received as a reception signal. The ultrasonic sensor device 5 can also have a control device S that can be formed, for example, by a microcontroller and/or a digital signal processor. The driver assistance system 2 additionally comprises a control device 10, which can be formed for example by an electronic control unit (ECU) of the motor vehicle 1. The control device 10 is connected to the ultrasonic sensor device 5 for data transfer. For example, the data can be transferred via the data bus of the motor vehicle 1.

FIG. 2 shows a schematic frequency-signal amplitude curve for determining a transfer function 13 of one embodiment of an ultrasonic sensor (5a). On the abscissa A of the graph in FIG. 1, in particular, a frequency is plotted in [kHz]. An ordinate O of the graph indicates a signal amplitude in [dB]. The signal amplitude depends on the electrical characteristic parameters K (FIG. 4), such as voltage and current. In particular, FIG. 1 shows that the transfer function 13 of the ultrasonic sensor 5a has a peak 12, which is located in particular at a resonance frequency R of the ultrasonic sensor 5a. In the example shown in FIG. 1 the resonance frequency R is at about 45 kHz. The ultrasonic sensor 5a is preferably operated in the resonance mode at the resonance frequency R.

By means of the transfer function 13 from FIG. 2, in particular the acoustic-electric behaviour of the ultrasonic sensor 5a can be represented. In particular, depending upon the design each ultrasonic sensor 5a has a specific transfer function 13. In particular, for example, the specific resonance frequency R of the ultrasonic sensor 5a can be in a frequency band which is represented in FIG. 1 using the example of −Δf and +Δf. For example, the frequency band can range between 40 kHz and 50 kHz. In particular, the resonance frequency R of the specific ultrasonic sensor 5a in this frequency band can then be checked and determined.

Due to external influences, such as environmental effects, ageing or sensor-related effects, it may be the case that the ultrasonic sensor 5a will have a different transfer function 13 compared to a reference transfer function 11 of a reference ultrasonic sensor. In particular, the transfer function 13 is different to the reference transfer function 11. By comparing the transfer function 13 against the reference transfer function 11, in particular a functional status of the ultrasonic sensor 5a can then be determined. For example, it is possible to determine whether the ultrasonic sensor 5a is dirty or affected by ice. The transfer function 13 is determined as a function of an electrical test signal P (FIG. 4), wherein the ultrasonic sensor 5a is excited with the electrical test signal P. The electrical characteristic parameter K, which can be in particular a voltage and/or a current in the ultrasonic sensor 5a, can then be evaluated and the transfer function 13 of the ultrasonic sensor 5a can be determined as a function thereof. In particular, the transfer function 13 is then compared with the reference transfer function 11, and the functional status of the ultrasonic sensor 5a can then be determined depending on the comparison. In particular, it can be provided that the test signal P is generated as a harmonic signal or as a step signal or as a pulse signal by a control device, in particular the control device (S) of the ultrasonic sensor 5a.

It can also be provided that the determination of the functional status of the ultrasonic sensor 5a can be carried out in a multiplicity of modes of operation of the motor vehicle 1, in particular during a driven operation of the motor vehicle 1. Thus, the functional status of the ultrasonic sensor 5a can be determined at the current time.

FIG. 3 shows an example schematic frequency-signal amplitude curve for determining an impedance frequency response 14 of the ultrasonic sensor 5a. In particular, the frequency is indicated in [kHz] on the abscissa A and a phase angle α in [°] is plotted on the ordinate O. The impedance frequency response 14 has a turning point at the resonance frequency R of the ultrasonic sensor 5a. In particular, at the resonant frequency R the impedance has a phase angle α of 0.

In particular, it is provided that the transfer function 13 is determined by means of the impedance frequency response 14, wherein the impedance frequency response 14 describes the electrical characteristic parameter K, in particular as the current and/or voltage as a function of the phase angle α between the two. For example, the impedance frequency response 14 can then be determined as a function of an injected current as the electrical test signal P, of a measured voltage dependent thereon as an electrical characteristic parameter K, and of a phase angle α of the injected current relative to the measured voltage, which is implemented as an electrical characteristic parameter K. It is also possible for the impedance frequency response 14 to be determined as a function of an injected voltage as an electrical test signal P, of a measured current dependent thereon as an electrical characteristic parameter K, and of the phase angle α of the injected voltage relative to the measured current, which is implemented as the electrical characteristic parameter K.

FIG. 4 shows a schematic equivalent circuit diagram of one embodiment of the ultrasonic sensor 5a as an electrical model 15 of the ultrasonic sensor 5a. In particular, the electrical model 15 describes the mechanical ultrasonic transducer 5a in electrical terms. In particular, the electrical model 15 comprises a plurality of components 16.

In particular, the electrical model 15 has a first capacitor 17, a second capacitor 18, an inductor 19 and an ohmic resistor 20. In particular, parameter values of the components 16 are chosen such that they can be characterized by the transfer function 13. In particular, it is provided that in the electrical model 15 the second capacitor 18, the inductance 19 and the ohmic resistance 20 are connected in series and the first capacitor 17 is connected in parallel with this series circuit.

In particular, the first capacitor 17 describes a physical capacitance of the ultrasonic sensor 5a, for example the ceramic of a piezo-ultrasonic sensor. The second capacitor 18 can describe, for example, a mechanical compliance, corresponding to the reciprocal of the stiffness, of a membrane of the ultrasonic sensor 5a. By means of the inductance 19, in particular a moving mass of the membrane can be modelled. The ohmic resistance 20 can describe, in particular, a damping of the ultrasonic signal 8. In particular, by means of the physical capacitance, the mechanical compliance, the moving mass and the damping, the at least one functional status of the ultrasonic sensor 5a can be determined.

For example, if a ceramic is defective, the capacitance of the first capacitor 17 can be reduced, so that a decrease in the first capacitance can be used to deduce a failure of the ceramic. If, for example, ice is present on the diaphragm of the ultrasonic sensor 5a, then for example the mechanical compliance and the moving mass may be altered, so that in the electrical model 15 a change in the second capacitor 16 or a change in the capacitance of the second capacitor 16 and a change in the inductance 19 would be detected. On the basis of the parameter value changes a conclusion can then be drawn as to the functional status of the ultrasonic sensor 5a.

In particular, it is provided that the parameter values of the components 16 are determined by means of a parameter value adjustment, in particular by means of a numerical optimisation, in such a way that with these adjusted parameter values the transfer function 13 is obtained in the form of a model.

In particular, the reference transfer function 11 and/or parameter values of a reference ultrasonic sensor that produces the reference transfer function 11 can then be stored on a storage medium of the ultrasonic sensor device 5 for a multiplicity of potential functional states. Thus, the individual parameter values of the components 16 can be compared with the parameter values of the components of the reference ultrasonic sensor and then, from the information stored in the memory, used to draw conclusions about the environmental conditions, the sensor conditions and/or the ageing of the ultrasonic sensor 5a.

In particular, it can be provided that information from at least one other sensor, such as a temperature sensor and/or an air humidity sensor and/or other sensor types, can also be taken into account in determining the functional status. The at least one other sensor can be part of the ultrasonic sensor 5a and/or the ultrasonic sensor device 5 and/or the motor vehicle 1.

In particular, it is provided that the transfer function 13 of the ultrasonic sensor 5a is therefore measured directly and hence internal to the sensor—without sending ultrasonic signals and evaluating received echo signals—and the functional status of the ultrasonic sensor 5a is determined on the basis of the transfer function 13. For this purpose, the ultrasonic sensor 5a is excited by means of the electrical test signal P. By means of the electrical test signal P the electrical characteristic parameter K of the ultrasonic sensor 5a is then manipulated and evaluated by the ultrasonic sensor 5a. As a function of the electrical characteristic parameter K, which can be detected in particular in the impedance frequency response 14, the transfer function 13 is determined. The electrical model 15 provided, with its components 16, is matched to the specific transfer function 13 by parameter value fitting, so that the components 16 characterize the transfer function 13. The matched parameter values are then compared with reference parameter values of a reference ultrasonic sensor and on the basis of the comparison are then used to draw conclusions as to the functional status of the ultrasonic sensor 5a.

The invention claimed is:

1. A method for determining a functional status of an ultrasonic sensor of an ultrasonic sensor device for a motor vehicle, comprising:

applying, in a normal mode during a driven operation of the motor vehicle, an excitation signal to the ultrasonic sensor to emit an ultrasonic signal into an environment of the motor vehicle and to receive an echo signal of the ultrasonic signal;

generating, in a diagnostic mode during the driven operation of the motor vehicle, an electrical test signal, which has a smaller amplitude than an amplitude of the excitation signal and differs in its signal properties from the excitation signal, wherein the electrical test signal is applied to excite the ultrasonic sensor without transmitting said ultrasonic signal into the environment of the motor vehicle;

evaluating, in the diagnostic mode during the driven operation of the motor vehicle, at least one electrical characteristic parameter of the ultrasonic sensor affected by the electrical test signal and independent of receiving any echo signal;

determining a transfer function of the ultrasonic sensor, wherein the transfer function comprises a relationship between the electrical test signal and the at least one electrical characteristic parameter that are applied and evaluated, respectively, independent of any echo signal and not distorted by any environmental effect; and comparing the transfer function with a reference transfer function to determine the functional status of the ultrasonic sensor.

2. The method according to claim 1, wherein the test signal is generated as a harmonic signal or as a step signal or as a pulse signal by a control device.

3. The method according to claim 1, wherein the transfer function is determined as a function of an impedance frequency response.

4. The method according to claim 3, wherein the impedance frequency response is determined as a function of an injected current as an electrical test signal, of a measured voltage which is dependent thereon as an electrical characteristic parameter, and of a phase angle difference of the injected current relative to the measured voltage, which is implemented as an electrical characteristic parameter.

5. The method according to claim 3, wherein the impedance frequency response is determined as a function of an injected voltage as an electrical test signal, of a measured current which is dependent thereon as an electrical characteristic parameter, and of a phase angle difference of the injected voltage relative to the measured current, which is implemented as an electrical characteristic parameter.

6. The method according to claim 1, wherein the transfer function is determined at a resonance frequency of the ultrasonic sensor.

7. The method according to claim 1, wherein a multiplicity of transfer functions is determined at a multiplicity of acoustic frequencies, wherein the multiplicity of the acoustic frequencies is generated in a frequency band between +/−Δf around a resonance frequency.

8. The method according to claim 1, wherein an electrical model of the ultrasonic sensor is generated with a multiplicity of electrical components, wherein the electrical model electrically describes the mechanical ultrasonic sensor, parameter values of the electrical model being characterized by the transfer function.

9. The method according to claim 8, wherein the electrical model of the ultrasonic sensor and/or the reference ultrasonic sensor is formed by a first capacitor, a second capacitor separate to the first capacitor, an inductor and an ohmic resistor, the second capacitor, the inductor and the ohmic resistor being connected in series and the first capacitor being connected in parallel with the series circuit.

10. The method according to claim 9, wherein a physical capacitance of the ultrasonic sensor is described by the first capacitor, a mechanical compliance of a diaphragm of the ultrasonic sensor by means of the second capacitor, a moving mass of the diaphragm by the inductor and a damping of the ultrasonic signal by the ohmic resistance.

11. The method according to claim 9, wherein relevant parameter values of the first capacitor, the second capacitor, the inductor and of the ohmic resistance of the ultrasonic sensor are determined by means of a parameter value fitting, in particular by means of a numerical optimisation, in such a way that by using these adjusted parameter values the transfer function is obtained in the form of a model.

12. The method according to claim 1, wherein the reference transfer function and/or parameter values of a reference ultrasonic sensor that produces the reference transfer function are stored on a storage medium of the ultrasonic sensor device for a multiplicity of potential functional states.

13. The method according to claim 1, further comprising:
determining, based on the functional status of the ultrasonic sensor, a degree of contamination, icing, or aging of the ultrasonic sensor that causes the ultrasonic sensor to be impaired; and
performing, in response to determining the degree of contamination, icing, or aging of the ultrasonic sensor, a corrective action to remove the contamination, to remove the icing, or to increase the excitation signal power of the ultrasonic sensor,
wherein the method is implemented in a plurality of modes of operation of the motor vehicle during the driven operation of the motor vehicle.

14. The method according to claim 1, wherein the functional status of the ultrasonic sensor is determined inside the sensor.

15. The method according to claim 1, wherein at least one ultrasonic signal is emitted and an echo signal is received in a first operating state of the ultrasonic sensor, and a self-diagnosis of the ultrasonic sensor is performed by applying the electrical test signal in a second operating state, different from the first operating state, of the ultrasonic sensor.

16. The method according to claim 1, wherein a bandwidth of the test signal is greater than a bandwidth of the excitation signal.

17. An ultrasonic sensor device with at least one ultrasonic sensor for a motor vehicle, comprising:
a transmitting device for transmitting ultrasonic signals,
a receiving device for receiving an echo signal of the ultrasonic signals, and
a control device of the ultrasonic sensor which is configured to implement a method according to claim 1.

18. A motor vehicle having an ultrasonic sensor device according to claim 14.

* * * * *